United States Patent [19]

Knapp

[11] Patent Number: 4,838,304
[45] Date of Patent: Jun. 13, 1989

[54] COMPACT CARTRIDGE FOR A SINGLE HANDLE FAUCET VALVE

[75] Inventor: Alfons Knapp, Biberach/Riss, Fed. Rep. of Germany

[73] Assignee: Masco Corporation, Taylor, Mich.

[21] Appl. No.: 207,402

[22] PCT Filed: Apr. 7, 1987

[86] PCT No.: PCT/US87/00800

§ 371 Date: Feb. 16, 1988

§ 102(e) Date: Feb. 16, 1988

[30] Foreign Application Priority Data

Apr. 9, 1986 [IT] Italy .................................. 67283 A/86
Apr. 9, 1986 [IT] Italy .................................. 67284 A/86

[51] Int. Cl.⁴ ........................................... F16K 11/074
[52] U.S. Cl. ............................. 137/454.6; 137/625.4; 251/127; 251/284
[58] Field of Search ............ 137/454.6, 625.17, 625.4, 137/625.41; 251/127, 284, 287, 288

[56] References Cited

U.S. PATENT DOCUMENTS

| | | | |
|---|---|---|---|
| 2,020,286 | 11/1935 | Bittle | 138/625.13 |
| 3,965,935 | 6/1976 | Morisseau | 137/625.4 |
| 3,965,936 | 6/1976 | Lyon | 137/625.17 |
| 4,088,153 | 5/1978 | Paasikiri | 137/625.17 |
| 4,130,136 | 12/1978 | Garnier et al. | 137/625.41 |
| 4,325,403 | 4/1982 | Uhlmann | 137/625.17 X |
| 4,327,758 | 5/1982 | Uhlmann | 137/625.17 |
| 4,596,376 | 6/1986 | Knapp | 137/625.17 |

*Primary Examiner*—John Rivell
*Attorney, Agent, or Firm*—Edgar A. Zarins; Malcolm L. Sutherland; Steven L. Permut

[57] ABSTRACT

A cartridge assembly for converting a single-handle faucet from a ball-type valve to a cooperating plate valve. The cartridge includes an outer body member (10) having one fixed valve plate (16) and one movable valve plate (19) and lever means (23) for controlling the relative motions of the plates. The body (10) has a substantially cylindrical upper portion and a lower portion (11) defined by inclined, semi-spherical surfaces. A pair of converging inlet passageways (12) communicate with throughbores (17) formed in the fixed plate (16) to control fluid flow through the assembly and to an outlet (7). The cartridge is designed to be introduced into the chamber (2, 3) of a faucet valve body (1) normally utilized with a ball-type valving member without requiring alteration of the faucet valve body (1) to thereby introduce flow regulation members composed of flat valve plates (16, 19) manufactured from hard, wear-resistant materials.

30 Claims, 2 Drawing Sheets

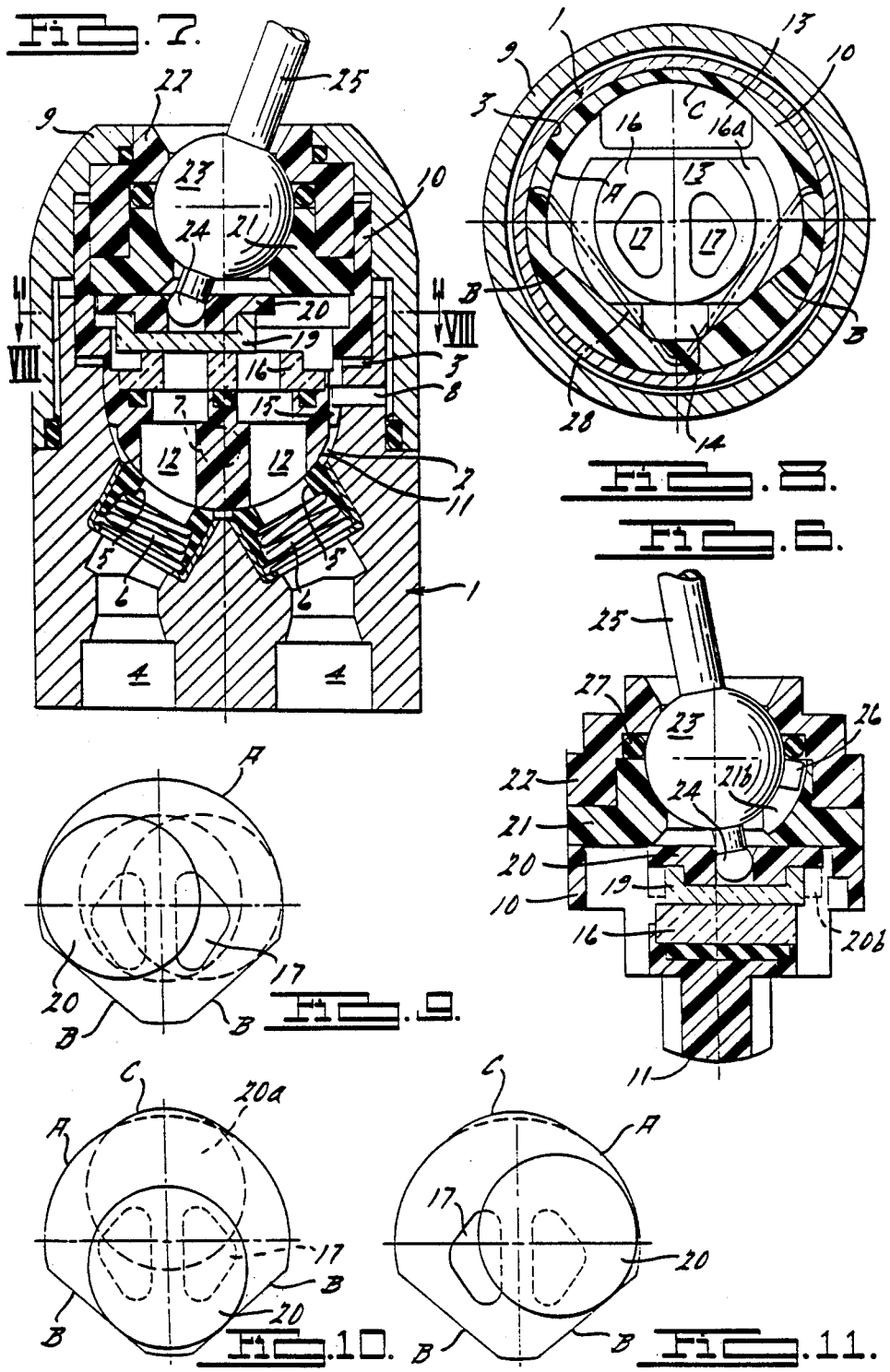

COMPACT CARTRIDGE FOR A SINGLE HANDLE FAUCET VALVE

BACKGROUND OF THE INVENTION

I. Field of the Invention

This invention relates to a flow control cartridge which includes flow control valve plates manufactured of a hard, wear-resistant material, one of which is stationary and one movable, and, in particular, to a cartridge adapted to be received in the faucet valve body of a single-handle faucet which normally utilizes a ball-type valving member to regulate the mixing ratio and fluid flow rate from a pair of fluid sources to the faucet spout.

II. Description of the Prior Art

Single-handle mixer valves are widely utilized to regulate the mixing ratio between hot and cold water, flowing from separate pipes and delivered to a faucet, where the mixing is accomplished by a spherical or ball-type valving member. The spherical valving member is connected to a control lever and seated within a chamber of the faucet body. The valving member cooperates with a pair of tubular gasket seals seated in the inlet passageways of the valve body and urged against the spherical valving member by bias springs. The interior chamber of the faucet valve body includes a lower hemispherical portion, adapted to receive the spherical valving member, and an upper substantially cylindrical portion where a check halfbearing of the valving member is disposed. Extending from this interior chamber is an outlet passageway which communicates with the faucet spout. The control lever or handle for the valve extends out of the top of the valve body through an opening in the check halfbearing. This opening delimits the range the control lever may shift thereby limiting the rotational positions of the valving member from the full off position to positions providing the full flow of hot water or the full flow of cold water.

Although the ball-type mixer valves provide excellent performance, the valving members are subject to wear, particularly in hard water areas. The spherical form of the valving member prevents the use of control members made of hard, wear-resistant materials of the type used in flat control valve plates. Thus, the faucet valve will tend to leak after prolonged use.

Furthermore, in many cases it is necessary or convenient to construct a flow control cartridge having a compact form by reducing the overall dimensions to an absolute minimum. The known valve assemblies are incapable of reduction because the means for controlling the movement of the movable disk member or the spherical valving member includes an exterior swivel ring with a guide member and a slide bearing connected to the movable disk and guided by the swivel ring. Oftentimes, the extreme positions of the slide member, which carries the movable disk, are determined by the shape of the opening within which the control lever travels in order to limit the movement of the lever. However, any manufacturing tolerance or wear either in the connection between the control lever and slide member or between the control lever and the opening causes the movable plate to be inconsistently positioned when the lever abuts against the opening. As a result, large overlap areas must be provided between the cooperating parts of the plates in order to guarantee proper operation and proper closure. This increases the dimensional requirements of the assembly while limiting the surface area of the flow openings which determines the fluid flow rate through the cartridge. Moreover, by providing a shaped opening which defines the shiftings of the control lever, the overall size of the valve is not only increased but the range of movement for the lever is limited which may result in inaccurate flow regulation.

SUMMARY OF THE PRESENT INVENTION

The present invention overcomes the disadvantages of the prior known flow control mixer valves by utilizing a compact cartridge suitable for insertion into the valve body of a single-handle faucet and which utilizes flat valving plates made from a hard, wear-resistant material.

This invention contemplates the modification of existing ball-type mixer valve assemblies to receive and utilize a valving assembly comprising a pair of cooperating valving plates made of a hard, wear-resistant material in place of the spherical valving member normally used in such faucet valves. This is achieved, according to the present invention, through a cartridge having valving members in the form of flat plates, at least one of which is fixed and one of which is movable. The cartridge includes control members for displacing the movable plate. The device utilizes the valve body of the ball-type valve and includes a substantially cylindrical upper portion and a lower portion having two converging inlet passageways formed therein and communicating with corresponding passages formed in the fixed plate in the cartridge. Accordingly, the cartridge can be introduced into the chamber of the valve body, the cylindrical portion of the cartridge housed in the cylindrical portion of the valve body chamber and inclined surfaces adapted to cooperate with the seal gaskets seated in the inlet passageways of the valve body. The inclined surfaces can be part of a semi-spherical portion of the cartridge which closely corresponds to the ball-type valving member to be replaced.

An object of the present invention is to perfect the inner structure of a flow control cartridge, including flow control plate members made of hard, wear-resistant materials, such that the cartridge may be inserted into the valve body of a single-handle mixer valve in order to regulate the mixing ratio and fluid flow rate. Additionally, the structure allows a wide range of movement for the control lever in order to facilitate an accurate regulation of fluid flow even after wear due to prolonged use. This is achieved by providing a solid movable valve plate disposed within a profiled frame formed by an interior fixed portion of the cartridge and surrounding a part integral to the movable plate. As a result, any irregularities due to wear or production tolerances in connecting the movable plate to the control members or between the control lever and the cartridge body, will not affect the extreme operative positions through which the movable plate travels so that the function of the faucet is not affected by wear on the valving member.

In addition, the amount of overlap between the cooperating plate surfaces can be minimized to reduce the overall dimensions or increase the maximum fluid flow rate. The range of motion for the control lever can be adjusted by altering the transmission ratios between the connected parts. Accordingly, the cartridge of the present invention is quite suitable for replacing the normal ball-type valving assembly found in single-handled faucets.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 6 is a cross-sectional perspective of the cartridge similar to FIG. 4 but with the members of the flow control assembly displaced into a different position;

FIG. 7 is a cross-sectional perspective of a valve assembly having the cartridge of the present invention disposed therein;

FIG. 8 is a transverse cross-sectional perspective of the valve assembly taken along line VIII—VIII of FIG. 7; and FIGS. 9 through 11 schematically illustrate the extreme positions of the movable valve plate with respect to the inlet passageways of the fixed valve plate.

DETAILED DESCRIPTION OF A PREFERRED EMBODIMENT OF THE PRESENT INVENTION

Figure 3:
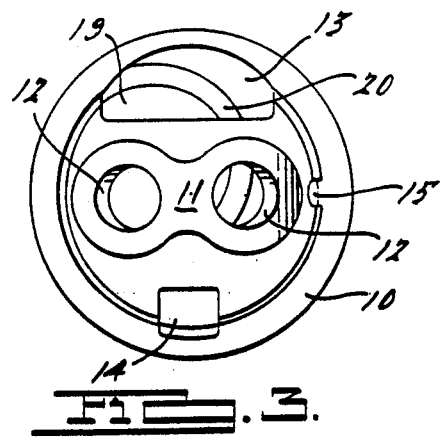
FIG. 3 is a bottom perspective view of the cartridge taken along arrow III of FIG. 1.
Figure 1:
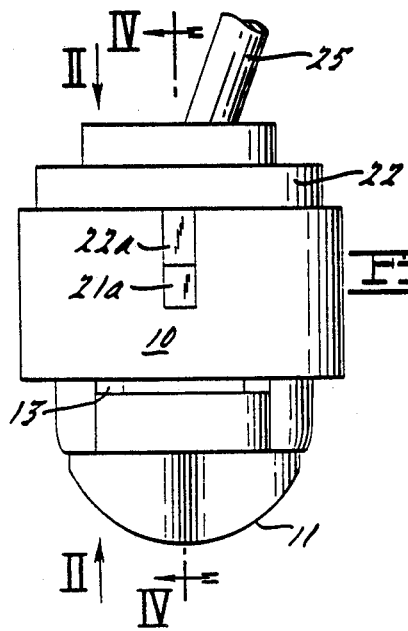
FIG. 1 is an external side elevational perspective of the cartridge of the present invention with the control lever partially shown.

The compact cartridge according to the present invention is adapted to replace the spherical valving member of a single-handle faucet as generally shown in FIG. 7. Such faucet assemblies generally comprise a faucet valve body 1 having an interior chamber with substantially hemispherical lower portion 2 and substantially cylindrical upper portion 3. Disposed at the lower end of the valve body 1 are two inlet passageways 4 which fluidly communicate with the hot and cold water supplies. The inlet passageways 4 open to the hemispherical lower portion 2 of the valve body 1 and include tubular seal gaskets 5 biased inwardly by springs 6. As shown in phantom in FIG. 7, an outlet passageway 7 is also included for supplying the mixed fluid to the faucet spout. A retaining member 9 is removably secured to the valve body 1 in order to enclose the operative assembly of the valve. The retaining member 9 includes a top opening through which a control arm extends and a seal gasket to prevent fluid leakage.

In the conventional ball-type faucet assembly, a halfbearing with a hemispherical seat is mounted within the cylindrical chamber portion 3 to retain a spherical valving member which cooperates with the seal gaskets 5 to regulate the mixing proportions and flow rates of the fluid flowing from the sources through passageways 4 to the outlet passageway 7. A locator pin 8 disposed in the valve body 1 is utilized to ensure proper orientation of the spherical valving member. The ball-type valve normally includes a control lever which extends through the opening in the halfbearing which is configured to limit the range of movement of the lever thereby limiting the positional range of the spherical valving member.

The compact cartridge according to the present invention is adapted to fit into the faucet valve body 1 in place of the spherical valving member and its halfbearing. Referring to FIGS. 1 through 7, the valving member or cartridge includes a cartridge body 10 having a substantially cylindrical upper portion adapted to be matingly received within the cylindrical chamber portion 3 of the valve body 1 in place of the halfbearing of the ball valve. The lower portion 11 of the body 10 includes a pair of inclined, semispherical surfaces and is adapted to be received within the hemispherical portion 2 of the valve body 1 and to sealingly abut the seal gaskets 5 of the inlet passageways 4. The cartridge body 10 further comprises a pair of ports 12 formed in the lower portion 11 thereof and in communicating alignment with openings 17 formed in a fixed valve plate 16 manufactured of a hard, wear-resistant material, such as ceramic. A seal gasket 18 is provided to prevent fluid leakage past the fixed plate member 16. In addition, the body member 10 comprises a primary outlet passageway 13 adapted to direct fluid flow to the outlet 7 of the valve body 1 and, preferably, a secondary outlet passageway 14 formed radially opposite to the primary opening 13. The cartridge body 10 also includes a groove 15 which cooperates with the locating pin 8 to properly orientate the cartridge when it is placed within the valve body 1.

A movable plate also constructed from a hard material such as ceramic is movably mounted on the fixed plate 16. The movable plate 19 is substantially circular and does not include apertures. The peripheral edge of the movable plate 19 interacts with the openings 17 of the fixed plate 16 to regulate fluid flow. The movable plate 19 is fixedly secured to or integrally formed with a slide member 20 which also has a circular configuration. In turn, the slide member 20 slidingly cooperates with the lower surface of a lower halfbearing 21 disposed within the body member 10 together with an upper halfbearing 22. These two halfbearings 21 and 22 each have a pair of flanges 21a and 22a, respectively, which are received in corresponding grooves formed in the body member 10. The halfbearings 21 and 22 together form a spherical seat adapted to receive an articulation ball 23 having a depending control stem 24 which engages the slide member 20. The ball 23, which acts as a pivot member, also includes an upper arm 25 which extends outside of the cartridge so as to form, either by itself or in conjunction with an attachable member, a lever or handle for control of the faucet. The articulation ball 23 may also include a guide pin 26 adapted to engage a guide groove 21b formed in the halfbearing 21 in order to direct the control lever when such orientation is required. A seal gasket 27 is disposed between the halfbearings 21, 22 and the ball 23 to seal these parts.

The fixed valve plate 16 includes a peripheral shoulder 16a to allow the flow of fluid about and past the plate. In addition, the shoulder 16a may be utilized to fixedly secure the disk 16 within the body 10 by way of a resilient clasp 28 (shown in phantom in FIG. 8).

The peripheral edge of the slide member 20 extends beyond the edge of the movable plate 19 with which it is connected. As a result, the edge of the slide member 20 will cooperate with a profiled rim of the inner periphery of the body 10 which forms a guide frame surrounding the slide member 20. This inner rim forms a frame including primarily (as illustrated in FIGS. 9-11) an arcuate portion A and angled portion B situated symmetrical to an axis passing between the openings 17 of the fixed plate 16. This disposition provides exactly three extreme positions (each shown in the FIGS. 9-11) for the slide member 20 and the plate 19. In the position shown in FIG. 10, the slide member 20 is in tangential alignment with edges B and fluid flow is interrupted. As shown in FIG. 9, the slide member 20 aligns with the arcuate edge A and one of the edges B as maximum flow through one of the openings 17 is realized while the other is closed off. Consequently, maximum delivery of only cold water is provided. Finally, FIG. 11 shows the valving plate in an opposite position resulting in full hot water flow. Thus, the sliding member 20 can be shifted (represented by the dashes in FIG. 9) from the delivery of cold water to the delivery of hot water passing through a series of intermediate positions.

Alternatively, if the slide member 20 is moved towards the position 20a, shown in phantom in FIG. 10, the delivery of hot and cold water is mixed. Having the slide 20 travel along the curved line A, different mixing ratios of hot and cold water are realized. In this manner, the extreme positions of flow regulation are fixedly determined by the wedging of slide member 20 between the edges A and B. Imprecisions resulting from wear or manufacturing tolerances, either in the connection between the control stem 24 and the slide member 20 or in the installation of the articulation ball within the halfbearings 21 and 22, results in a certain amount of slack in manuevering the control lever but does not have any influence on the extreme positions of the movable plate 19. Consequently, the outlines of the movable plate 19 and of the openings 17 in the fixed plate 16 can be precisely determined.

Figure 2:
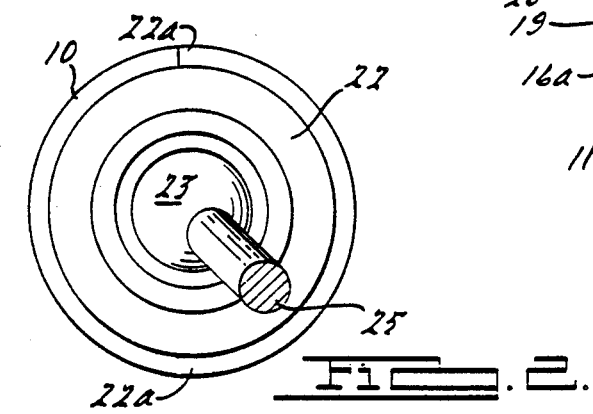
FIG. 2 is a top perspective view of the cartridge taken along arrow II of FIG. 1.
Figure 4:
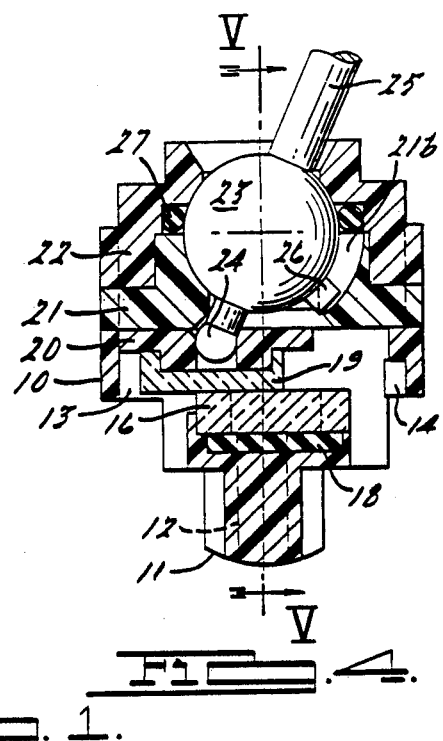
FIG. 4 is a cross-sectional perspective of the cartridge taken along line IV—IV of FIG. 1.
Figure 5:
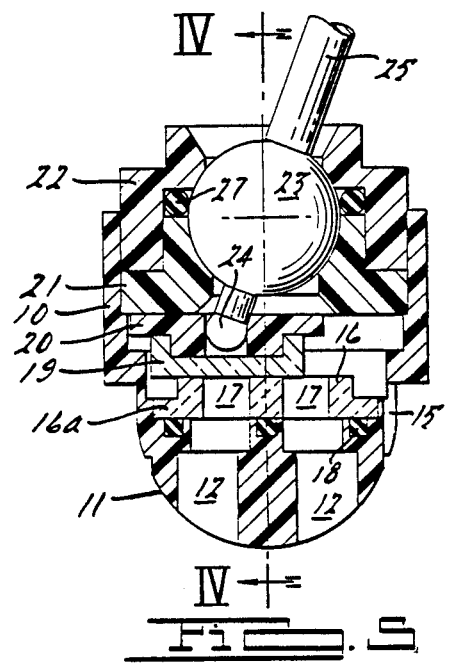
FIG. 5 is a cross-sectional perspective of the cartridge taken along line V—V of FIG. 4.

No particular shape is required for the opening in the upper halfbearing 22 through which the arm 25 extends and as a result the opening can be circular such that movement of the control arm 25 is not limited (as shown by the opening in FIG. 2). Moreover, in order to increase the maximum deliverable flow rate, the arcuate line of the outline A which determines the extreme positions of the movable plate, can advantageously include a recess C in the form of a circle or ellipse in order to provide a detent position. Preferably, the recess C is formed opposite the straight edges B as shown in FIGS. 10 and 11. It should be noted that because of the circular configuration of the plate 19 and its respective slide member 20, the movable plate 19 does not need to be prevented from rotating within the sleeve 10. As a result, the depending control stem 24, which transmits the transversal shiftings to the movable plate, can include an at least partially spherical head without the necessity of incorporating a key or other device to prevent rotation of the plate 19 and member 20 as is required in past known devices. The feature reduces manufacturing complexity and malfunction resulting from wear and tear.

The construction of the cartridge and the use of an interior guide frame results in an extremely compact assembly which provides efficient regulation of fluid flow as well as increased fluid flow. The cartridge of the present invention can be utilized in the valve body of a single-handle mixer valve which originally utilized a ball-type valving member thereby converting the assembly to a disk-type faucet using cooperating valve plates of a hard, wear-resistant ceramic material. Of course, the valve assembly of the present invention can be used in other valve bodies such as a valve body having a flat bottom. Furthermore, the original cap 9 from the original faucet assembly can be utilized with appropriate dimensioning of the cartridge. Preferably, however, the original cap 9 can be replaced with a retaining member having an increased height in order to more efficiently receive the cartridge. In either event, conversion of the faucet assembly can be completed with a minimum of difficulty.

Additionally, various alterations can be made to the present assembly without departing from the scope and spirit of the invention. For example, the hemispherical surface 11 of the body member 10 can be made conical or planar with only small areas adapted to cooperate with the gaskets 5 of a semispherical configuration. Moreover, the frame defined by the edges A, B and C, instead of being formed by the inner periphery of the sleeve body 10, can be defined by the lower opening formed in the lower halfbearing 21 in which case the diameter of the slide member 20 need not be wider than the diameter of the movable plate 19. The slide member 20 can be provided with a plurality of ribs or flanges 20b (FIG. 6), positioned to reduce flow noise around the movable plate 19. Finally, means may be provided for releasably securing the upper halfbearing 22 to the sleeve body 10 in order to secure the components when the cartridge is not seated within the valve body of a faucet.

The foregoing detailed description has been given for clearness of understanding only and no unnecessary limitations should be understood therefrom as some modifications will be obvious to those skilled in the art without departing from the scope and spirit of the appended claims.

I claim:

1. In a fluid flow control cartridge adapted to be disposed in a faucet valve body of a single-handle faucet in order to regulate the mixing ratio and rate of fluid flow through the faucet, said cartridge comprising:
    a body housing a pair of flow control valve plates formed of a hard, wear-resistant material, one of said valve plates being fixed and one of said valve plates movable, said body including interior framing means for limiting the movement of said movable valve plate, said interior framing means comprising an inner outline edge of said body within which said movable valve plate is disposed; and
    means for controlling the movement of said movable valve plate.

2. The cartridge as defined in claim 1 and further comprising a slide member fixedly secured to said movable plate, said slide member having a diameter greater than the diameter of said movable plate whereby said slide member selectively engages said interior framing means to limit the movement of said movable plate.

3. The cartridge as defined in claim 2 wherein said inner outline edge of said body selectively engages said slide member of said movable plate to limit the movement of said movable plate.

4. The cartridge as defined in claim 3 wherein said inner framing outline includes a substantially arcuate edge and two linear edges disposed at an angle to each other said liner edges of said inner framing outline are disposed symmetrically to an axis extending between a pair of fluid openings formed in said fixed valve plate.

5. The cartridge as defined in claim 4 wherein said inner framing outline further comprises a recess formed in said arcuate edge.

6. The cartridge as defined in claim 2 wherein said slide member slidably engages a lower surface of a lower halfbearing, said lower halfbearing disposed in said body with an upper halfbearing to form a spherical seat adapted to receive said controlling means, said controlling means comprising an articulation ball, said articulation ball having a control stem connected to said slide member and a control arm extending out of said cartridge through an opening formed in said upper halfbearing.

7. The cartridge as defined in claim 6 wherein said opening in said upper halfbearing is circular such that said opening does not limit the movement of said control arm.

8. The cartridge as defined in claim 6 wherein said slide member includes flow control ribs disposed outwardly of the peripheral edge of said movable plate.

9. The cartridge as defined in claim 4 wherein said body includes a substantially cylindrical upper portion and a lower portion having a pair of inclined surfaces with inlet ports formed therein, said inlet ports communicating with said openings in said fixed plate.

10. A fluid flow control cartridge for regulating the mixing ratio and rate of fluid flow from a pair of fluid sources to a faucet spout, said control cartridge adapted to replace a ball-type valving member of a single-handle faucet valve, the faucet valve body defining an interior chamber having an upper cylindrical portion and a lower hemispherical portion, the valve body including two inlet passageways providing fluid communication between the interior chamber and the faucet spout, said flow control cartridge comprising:
  a body having a substantially cylindrical upper portion and lower portion with a pair of substantially semispherical inclined surfaces, said upper and lower portions matingly received in the interior chamber of the valve body, said lower body portion including inlet ports formed in said inclined surfaces and aligned with the two inlet passageways of the valve body;
  a fixed flow control valve plate fixedly mounted within said body, said fixed valve plate having a pair of openings aligned with said inlet ports of said cartridge body;
  a movable flow control valve plate slidably mounted within said body adjacent said fixed valve plate, said movable plate cooperating with said fixed plate to selectively open and close said openings in said fixed valve plate; and
  means for controlling the movement of said movable valve plate;
  said body including interior framing means for limiting the positional movement of said movable plate, said framing means selectively engaging said movable plate.

11. The cartridge as defined in claim 10 and further comprising a slide member fixedly secured to said movable valve plate, said slide member having a diameter greater than the diameter of said movable plate.

12. The cartridge as defined in claim 11 wherein said interior framing means comprises an interior guide frame formed by an interior edge of said body, said slide member and movable plate positionally captured within said guide frame whereby the movements of said movable plate are limited by the configuration of said guide frame, said slide member selectively engaging said guide frame.

13. The cartridge as defined in claim 12 wherein said interior guide frame includes a substantially arcuate edge and two diverging linear edges disposed at an angle to each other, said linear edges disposed symmetrically to an axis extending between said openings of said fixed valve plate.

14. The cartridge as defined in claim 13 wherein said interior guide frame further comprises a recess formed in said arcuate edge.

15. The cartridge as defined in claim 10 wherein said means for controlling the movement of said movable valve plate comprises an articulation ball having a depending control stem interconnected with said slide member and movable plate and a control arm extending outwardly of said cartridge, said articulation ball seated between upper and lower halfbearings mounted in said cartridge body.

16. In a fluid flow control cartridge adapted to be disposed in a faucet valve body of a ball-type single-handle faucet in order to regulate the mixing ratio and rate of fluid flow through the faucet, said cartridge including at least one fixed flow control valve plate, at least one movable flow control valve plate, and means for controlling the movement of said movable valve plate member, said cartridge comprising:
  a body having a substantially cylindrical upper portion and a lower portion having substantially inclined surfaces, said lower portion including at least two inlet ports open to said inclined surfaces and communicating with corresponding openings formed in said fixed valve plate whereby said cartridge is installed in the chamber of the faucet valve body adapted to cooperate with the ball-type valving member such that said cylindrical upper portion of said body is received within the cylindrical portion of the faucet valve body with said inclined surfaces sealingly abutting gaskets seated within the inlet passageways of the faucet valve body to thereby provide fluid communication from the inlet passageways of the faucet valve body through said cartridge to an outlet passageway of the faucet valve body.

17. The cartridge as defined in claim 16 wherein said movable valve plate has a solid, circular configuration, the movement of said movable plate limited by a guide frame formed by an interior portion of said body, said guide frame selectively engaging a slide member fixedly secured to said movable plate.

18. The cartridge as defined in claim 17 wherein said guide frame is formed by an inner outline of said cartridge, said guide frame surrounding a circular slide member fixedly secured to said movable plate.

19. The cartridge as defined in claim 17 wherein said guide frame of said cartridge includes a substantially arcuate edge and two linear edges disposed at an angle to each other, said linear edges disposed symmetrically to an axis extending between said openings of said fixed valve plate.

20. The cartridge as defined in claim 19 wherein said arcuate edge of said guide frame includes an arcuate recess.

21. The cartridge as defined in claim 17 wherein said slide member secured to said movable valve plate slidably contacts a lower surface of a lower halfbearing, said lower halfbearing being disposed within said body of said cartridge together with an upper halfbearing, said halfbearings forming a spherical seat adapted to receive an articulation ball, said articulation ball including a depending control stem connected to said slide member and a control arm extending outwardly of said cartridge through an opening formed in said upper halfbearing.

22. The cartridge as defined in claim 21 wherein said opening formed in said upper halfbearing is circular so as not to limit the movements of said control arm when said control stem of said articulation ball is connected to said slide member.

23. The cartridge as defined in claim 21 wherein said slide member extends beyond the peripheral edge of said movable valve plate to form depending ribs to control fluid flow noise.

24. A fluid flow control cartridge adapted to replace a ball-type valving member in a single-handle faucet valve body, the faucet valve body defining an interior chamber, the valve body including two inlet passageways providing fluid communication between corresponding fluid sources, the interior chamber, and an outlet passageway, said flow control cartridge comprising:
   a body having a substantially cylindrical upper portion and a lower portion having inclined, substantially hemispherical surfaces, said upper and lower portions matingly corresponding to the configuration of the interior chamber of the valve body, said lower portion including two inlet ports formed therethrough and aligned with the two inlet passageways of the valve body;
   a fixed flow control valve plate fixedly mounted within said body, said fixed valve plate having a pair of openings aligned with said inlet ports of said body;
   a movable flow control valve plate slidably mounted within said body, said movable valve plate cooperating with said fixed valve plate to selectively open and close said openings in said fixed valve plate, said movable plate fixedly secured to a slide member; and
   means for controlling the movement of said slide member and movable valve plate.

25. The cartridge as defined in claim 24 wherein said movable valve plate has a solid circular configuration and said slide member has a circular configuration.

26. The cartridge as defined in claim 25 wherein said cartridge body includes an interior guide frame, said slide member and said movable plate disposed within said guide frame to limit the movement thereof, said slide member selectively engaging said guide frame.

27. The cartridge as defined in claim 26 wherein said guide frame of said cartridge includes a substantially arcuate edge and a pair of diverging linear edges disposed at an angle to each other, said linear edges disposed symmetrically to an axis extending between said opening of said fixed valve plate.

28. The cartridge as defined in claim 27 wherein said arcuate edge of said guide frame includes a recess.

29. The cartridge as defined in claim 24 wherein said means for controlling movement of said movable plate comprises an articulation ball having a depending control stem connected to said slide member and a control arm extending outwardly of said cartridge.

30. The cartridge as defined in claim 29 wherein said slide member secured to said movable valve plate slidably contacts a lower surface of a lower halfbearing disposed within said body, said lower halfbearing together with an upper halfbearing forming a spherical seat adapted to receive said articulation ball, said control arm extending through an opening faucet in said upper halfbearing.

* * * * *